(12) United States Patent
Bremer et al.

(10) Patent No.: US 8,931,823 B2
(45) Date of Patent: Jan. 13, 2015

(54) TARP ROLL-UP WITH PIVOTING RADIAL ARMS

(71) Applicants: Donald William Bremer, Sioux City, IA (US); Terry L. Berg, Sioux City, IA (US)

(72) Inventors: Donald William Bremer, Sioux City, IA (US); Terry L. Berg, Sioux City, IA (US)

(73) Assignee: Sioux City Tarp, Inc., Sioux City, IA (US)

( * ) Notice: Subject to any disclaimer, the term of this patent is extended or adjusted under 35 U.S.C. 154(b) by 0 days.

(21) Appl. No.: 13/844,390

(22) Filed: Mar. 15, 2013

(65) Prior Publication Data

US 2014/0265424 A1    Sep. 18, 2014

(51) Int. Cl.
  *B60P 7/04* (2006.01)
  *B60J 7/08* (2006.01)

(52) U.S. Cl.
  CPC .................................... *B60J 7/085* (2013.01)
  USPC ........................................................... 296/98

(58) Field of Classification Search
  USPC ............ 296/98, 100.11, 100.14, 57.1; 74/625
  See application file for complete search history.

(56) References Cited

U.S. PATENT DOCUMENTS

| | | | | |
|---|---|---|---|---|
| 5,292,169 | A | * | 3/1994 | O'Brian .......................... 296/98 |
| 5,685,594 | A | * | 11/1997 | Harper ............................ 296/51 |
| 6,974,176 | B2 | * | 12/2005 | Smith et al. ..................... 296/98 |
| 7,188,887 | B1 | * | 3/2007 | Schmeichel .................... 296/98 |
| 7,654,600 | B2 | * | 2/2010 | Stratten .......................... 296/50 |
| 7,967,364 | B1 | * | 6/2011 | Kartes ....................... 296/100.14 |
| 8,267,461 | B2 | * | 9/2012 | Prince et al. ............. 296/100.14 |

OTHER PUBLICATIONS http://www.rollrite.com/gallery.php?p mode=2&p id=116#, web site for Roll-Rite Tarps,undated.*
http://www.rollrite.com/show.image.php?g id=944, tarp deployed Smithco, undated.*

* cited by examiner

*Primary Examiner* — Dennis H Pedder
(74) *Attorney, Agent, or Firm* — McKee, Voorhees & Sease

(57) ABSTRACT

A tarp deploying apparatus includes radial arm with a proximal arm and a distal arm. A flexible inelastic limit element is provided between the proximal and distal arms to prevent them from crossing over center to an angle that would cause the apparatus to bind.

2 Claims, 8 Drawing Sheets

TARP ROLL-UP WITH PIVOTING RADIAL ARMS

FIELD OF THE INVENTION

This invention relates generally to the field of tarp deploying devices for use on trailers, and especially to tarp deploying apparatuses that use pivoting radial arms.

BACKGROUND OF THE INVENTION

Trailers used to haul loose materials such as dirt, sand, gravel, or grain commonly have beds or tubs that have an open top with generally vertical front and rear walls and sloping sidewalls for retaining contents within the trailer. Therefore, if the trailer bed is not covered as the trailer is pulled over the road, the loose contents may be blown and scattered out of the open top of the trailer bed. Additionally, the contents of the trailer bed may be compromised by rain, or other contaminants. Accordingly, it is known to deploy tarps across the open top space of the trailer beds to cover the contents of the trailer beds.

Several mechanisms have been devised for deploying the tarps across the trailer bed. Many of these devices include radial arms that are rotatably mounted at the front and rear of the tub and have a roll of tarp disposed between them. As the radial arms rotate in one direction across the truck bed, the roll of tarp between the arms is unrolled to cover the contents of the truck bed. When the arms are rotated back in the opposite direction, the tarp is taken back up upon the roll to uncover the trailer bed. Examples of such devices may be seen in Searfoss, U.S. Pat. No. 6,206,449 and in Michel, U.S. Pat. No. 5,002,328.

For designs that use a pair of pivotally connected arms to form the radial arms, a problem can arise as the arms move across their length of greatest extent in that precaution must be taken to prevent the arms from pivoting over center, which will cause the system to bind. Heretofore that has been accomplished by a combination of springs that urge the arms toward the appropriate side of center alignment, and making the arms long enough that they do not approach alignment with each other at the areas of greatest extent. However, these solutions could be improved upon by eliminating the springs, which can be relatively expensive and time consuming to install, and by shortening the arms to reduce weight and save material. The present invention provides such a solution.

BRIEF SUMMARY OF THE INVENTION

According to one embodiment, the present invention relates to a tarp deploying apparatus that include includes a radial arm that is pivotally mounted to a wall of a trailer. The radial arm includes a proximal member and a distal member that are pivotally connected to each other. The proximal member is pivotally connected to the wall of the trailer. The distal member is operably connected to support a tarp roller. A flexible, but inelastic limit element is attached to each of the proximal and distal arms. The limit element is short enough to prevent the arms from extending to an aligned position.

DETAILED DESCRIPTION OF THE PREFERRED EMBODIMENT

Figure 1:
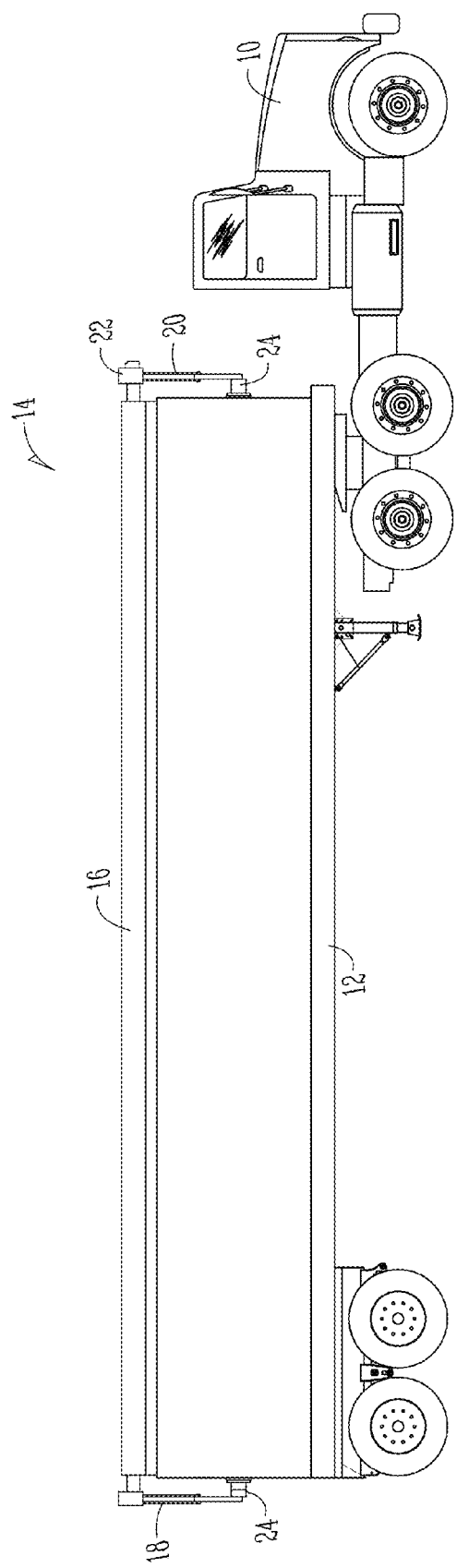
FIG. 1 is a side elevation view of a truck and trailer with a tarp deploying apparatus according to one embodiment of the present invention.

FIG. 1 shows a truck 10 and trailer 12 provided with a tarp roll-up system 14 according to one embodiment of the present invention. The tarp roll-up system 14 includes a tarp 16 supported between rear and front radial arms 18 and 20. The front radial arm 20 has at its free end a winch-style motor 22 used to roll and unroll the tarp 16 across the top opening of the trailer 12. Each of the radial arms 18 and 20 are pivotally connected to the walls of the trailer 12 via mounting brackets 24.

Figure 2:
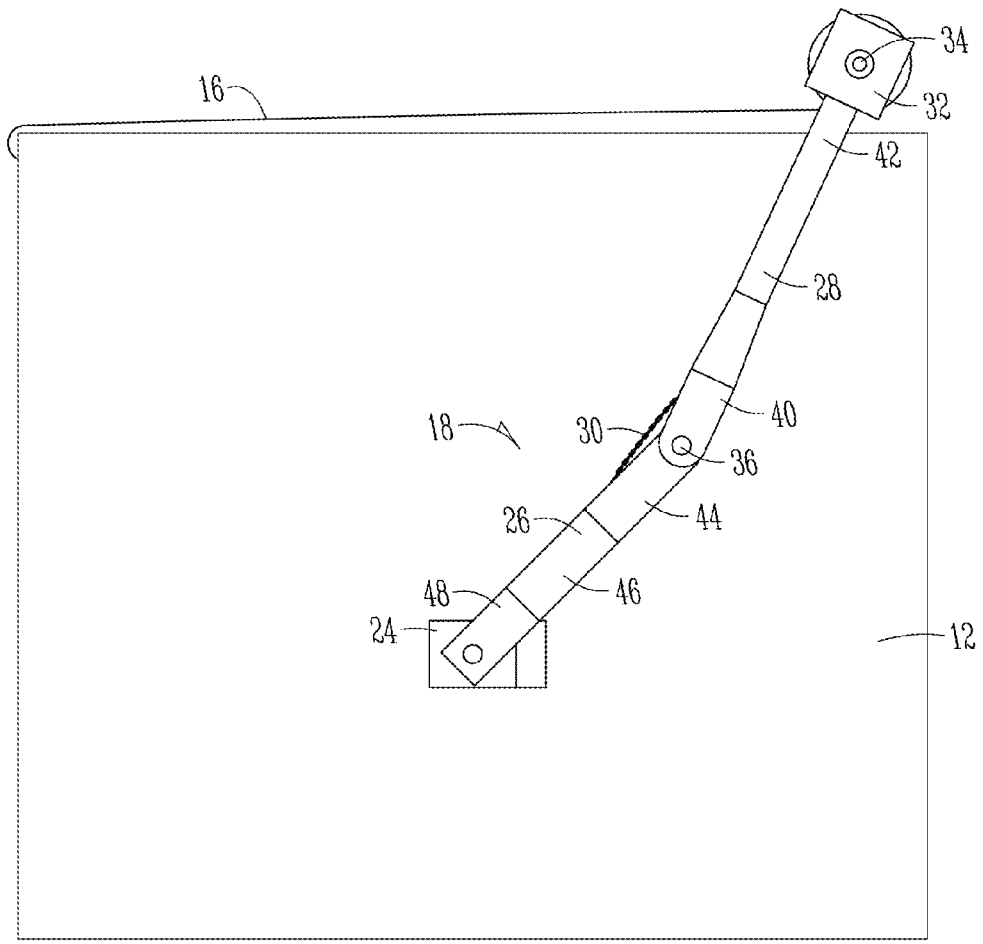
FIG. 2 is a partial rear view of the trailer and tarp deploying apparatus of FIG. 1.

FIG. 2 shows a rear view of a portion of the trailer 12 and tarp roll-up system 14 from FIG. 1. The rear radial arm 18 comprises a proximal member 26 that is pivotally connected at a constrained end to the bracket 24 at pivot support 48, and pivotally connected by pivot member 36 to a distal member 28 at the moving end of the proximal member 26 at joint member 40. A distal arm member 42 extends from the joint member 40 to operably attach to the connection member 32 that connects the rear radial arm 18 to the tarp 16 via a splined end 32 of the tarp roller. An inelastic but flexible limit element 30, such as a metal chain, is provided between the joint member 44 of the proximal arm 26 and the joint member 40 of the distal arm 28.

Figure 3:
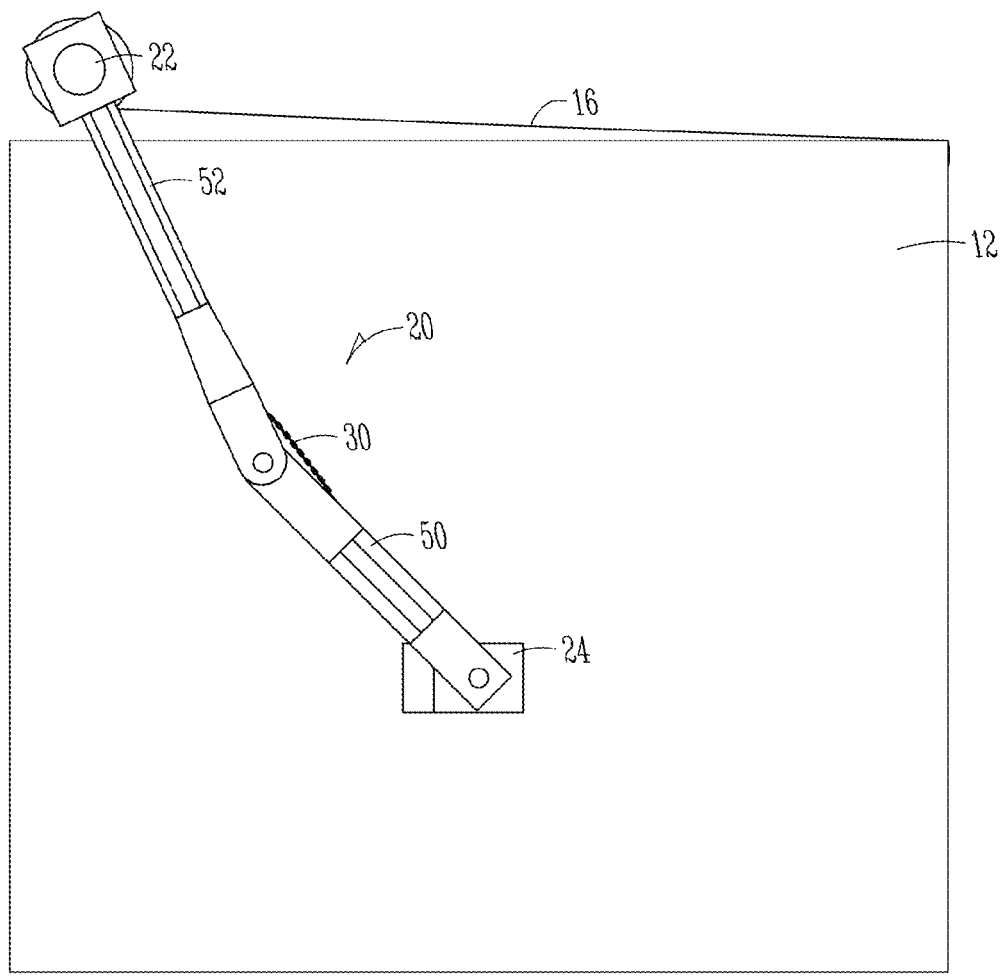
FIG. 3 is a partial front view of the trailer and tarp deploying apparatus of FIG. 1.

FIG. 3 shows a front view of a portion of the trailer 12 and tarp roll-up system 14 from FIG. 1. The rear radial arm 30 comprises a proximal member 50 and a distal member 52. The proximal member 50 is pivotally connected to the front wall of the trailer by mounting bracket 24. The distal member 52 is pivotally connected to the moving end of the proximal member 50. At the opposite end of the distal member 52, the winch-style motor 22 is mounted. A chain 30, that acts as a flexible, but inelastic limit element is provided between the proximal and distal members 50 and 52. The chain 30 is set at the appropriate length such that the members 50 and 52 cannot move all the way to full alignment with each other.

In operation, as the winch motor 22 deploys the tarp 16 across the top of the trailer 12, the radial arms 18 and 20 will be stretched to nearly their full lengths as the arms approach the corners of the trailer 12. If arm members 26 and 28 in the rear and 50 and 52 in the front extend all the way such that the arm members are fully aligned with each other they would run the risk of reaching an angle over center, where the force of the tarp 16 pulling on the arm will end to flex the arm members 26 and 28 and 50 and 52 in the wrong direction. The chain 30 prevents the arm members 26 and 28 as well as 50 and 52 from reaching this position, thereby assuring that the roll-up system will not bind.

Figure 4:
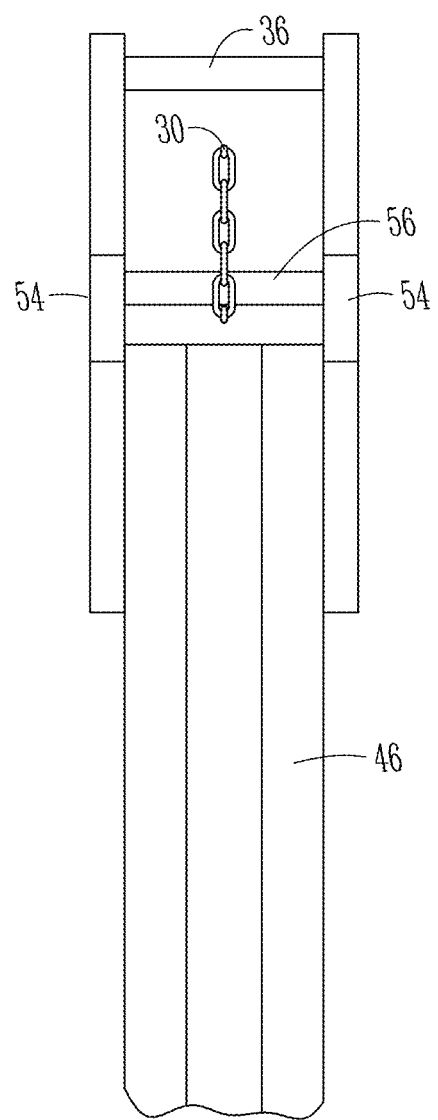
FIG. 4 is a detail partial view of the free end of the proximal radial member of the radial arm of the tarp deploying apparatus of FIG. 1.
Figure 5:
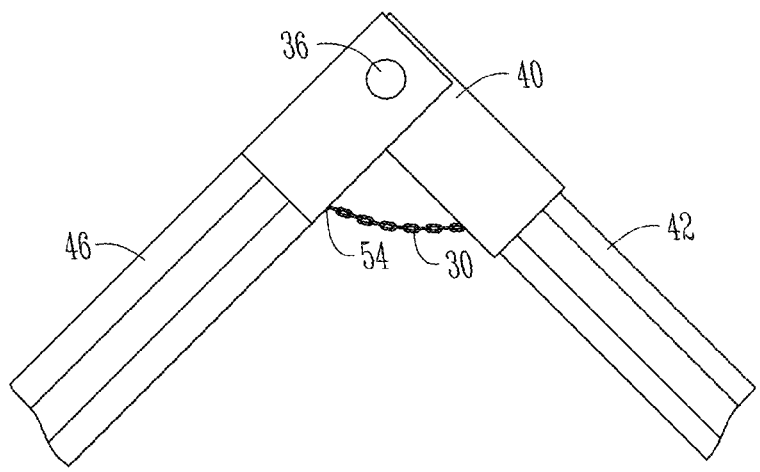
FIG. 5 is a partial detail view of a joint between the proximal and distal radial members according to one embodiment of the present invention.

FIG. 4 is a detail view of the free end of the proximal radial member 26 of the rear radial arm 18 of the tarp deploying apparatus 14 of FIG. 1. The arm member 46 may be a hexagonal extruded member. The arm member 46 is fastened by welding or other connection element to joint member 44. Joint member 44 has ears that support bar 56. The chain 30 is supported by the bar 56. Pivot member 36 is also supported by the joint member 44. FIG. 5 illustrates the connection between the proximal and distal members of the rear radial arm 18.

Figure 6:
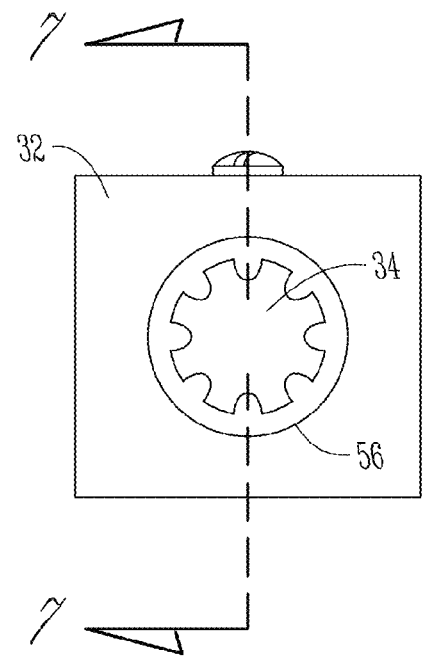
FIG. 6 is a rear detail view of the connection between the rear distal radial member and the splined end of the tarp roller according to one embodiment of the present invention.
Figure 7:
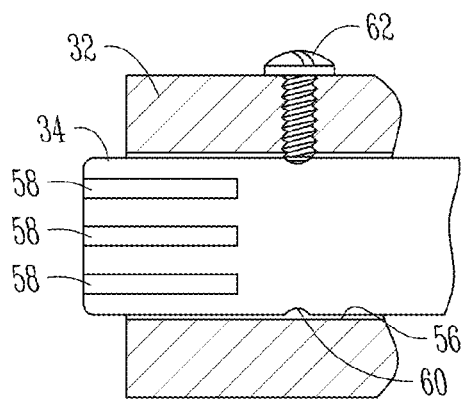
FIG. 7 is a partial cross-section view of the connection of FIG. 6.

FIG. 6 is a rear detail view of the connection member 32 of FIG. 2. As can be seen in FIG. 6, the connection member 32 has a channel 56 that supports a splined end 34 of the tarp roller. FIG. 7 shows a partial cross section view of the connection member 32 from FIG. 6. As seen in FIG. 7, the splined end 34 of the tarp roller includes a plurality of splines 58. A circumferential groove 60 is formed near the splines 50 to interact with retention member 62 to retain the tarp roller in the connection member 32. The channel is smooth such that the tarp roller and freely roll within the channel 56.

Figure 8:
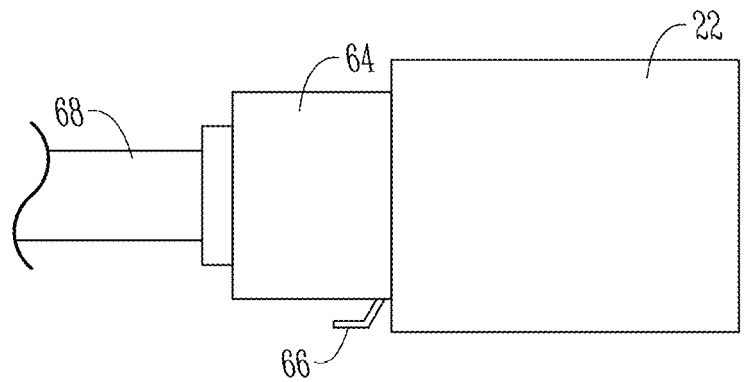
FIG. 8 is a partial side detail view of the connection between the quick release winch at the front distal radial member and the tarp roller.

FIG. 8 is a partial side detail view of the connection between the quick release winch motor 22 at the front distal radial member and the tarp roller 68. The winch motor provides rotational force to the tarp roller 68 through gears contained within gear box 64. A quick release lever 66 is provided to disengage the winch motor 22 from the gears within gear box 64. This quick release if important for permitting a user to manually roll and unroll a tarp in case of lack of power of motor failure. There is no need to remove the motor from the arms. Using the quick release essentially shifts the system in to neutral. A hand crank (not shown) can be attached to the splined end 34 of the tarp roller and the tarp 16 can be manually adjusted without overcoming the resistance of the motor 22.

Figure 9:
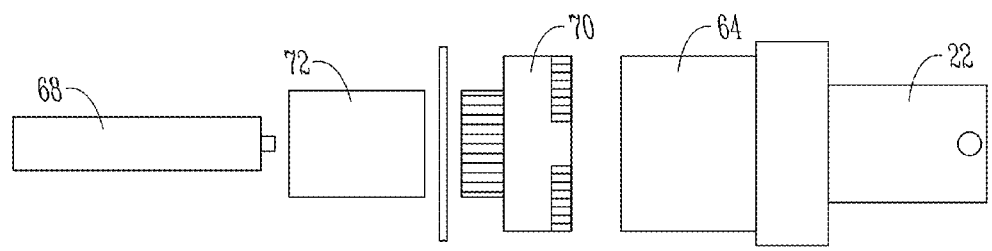
FIG. 9 is an assembly view of how the winch of FIG. 8 connects to the tarp roller.

FIG. 9 is an assembly view of how the winch motor 22 of FIG. 8 connects to the tarp roller 68. The gear box 64 contains at one end an outer planetary gear 70. A coupler 72 is secured to the outer planetary gear 70, for example by welding. The tarp roller 68 is also secured to the coupler 72, for example by welding.

Figure 10:
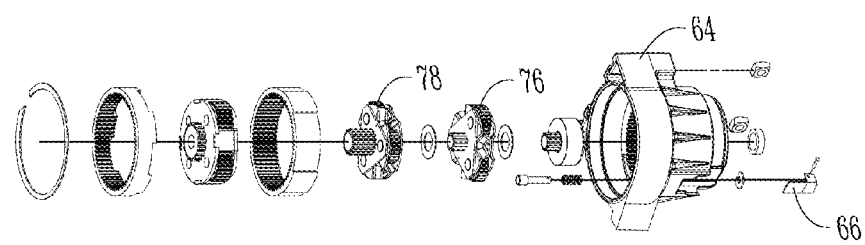
FIG. 10 is an exploded view of the winch with quick release from FIG. 8.

FIG. 10 is an exploded view of the winch with quick release from FIG. 8. FIG. 10 shows the contents of the gear box 64. Release lever 66 can be adjusted to with draw the drive shaft 74 from the inner 76 and outer 70 planetary gears. The planetary gears 70 and 76 provide a superior drive mechanism for the tarp roll-up system 14.

What is claimed is:

1. A tarp deploying apparatus comprising:
   a radial arm, the radial arm including a proximal member having a first end and a second end and a distal member having a first end and a second end, and wherein the proximal and distal members are pivotally connected to each other by a pivotal connection proximate to the second end of the proximal member and proximate to the first end of the distal member;
   the first end of the proximal member being pivotally connected to a wall of a trailer;
   the second end of the distal member supporting a motor that is operably connected to rotate a tarp roller; and
   a flexible, inelastic limit element attached to each of the proximal and distal members, the limit element permitting free pivoting of the distal member relative to the proximal member, except that the limit element being short enough to prevent the members from extending to a fully aligned position; and wherein
   the proximal member includes a first joint member secured to a proximal arm member;
   the distal member includes a second joint member secured to a distal arm member;
   the first joint member includes a first pair of spaced apart ears supporting a first bar;
   the second joint member includes a second pair of space apart ears supporting a second bar;
   the limit element is attached at a first end to the first bar and at a second end to the second bar; and
   a pivot member is provided between the first and second joint members, which forms the pivotal connection between the second end of the proximal member and the first end of the distal member.

2. The tarp deploying apparatus of claim 1, wherein the limit element is a chain.

\* \* \* \* \*